United States Patent [19]

Hawkes

[11] 4,429,795

[45] Feb. 7, 1984

[54] BOOK REJECT MECHANISM

[75] Inventor: Richard B. Hawkes, Peru, N.Y.

[73] Assignee: Harris Graphics Corporation, Melbourne, Fla.

[21] Appl. No.: 315,711

[22] Filed: Oct. 28, 1981

[51] Int. Cl.³ .................... B07C 9/00; B65G 37/00; B65G 47/46
[52] U.S. Cl. .................... 209/651; 198/367; 198/372; 412/12; 209/654
[58] Field of Search ............... 209/651–654; 198/364, 367, 370, 372, 437, 440, 644; 412/9, 11–14

[56] References Cited

U.S. PATENT DOCUMENTS

| | | | |
|---|---|---|---|
| 3,165,193 | 1/1965 | Stevenson, Jr. | 198/440 X |
| 3,170,572 | 2/1965 | Harrison | 209/651 X |
| 3,232,417 | 2/1966 | Muller | 198/367 |
| 3,384,237 | 5/1968 | Leonard | 198/370 X |
| 3,429,417 | 2/1969 | DeGood et al. | 198/367 |
| 3,701,176 | 10/1972 | Procter et al. | 412/12 X |
| 4,371,156 | 2/1983 | Pessina et al. | 198/644 X |

*Primary Examiner*—Robert B. Reeves
*Assistant Examiner*—Edward M. Wacyra
*Attorney, Agent, or Firm*—Yount & Tarolli

[57] ABSTRACT

The disclosure relates to a mechanism for moving unfinished books along a raceway and for selectively moving defective books from the raceway onto a second, powered conveyor. The raceway has an inclined surface, and the reject mechanism moves defective books up the inclined surface onto the powered conveyor. The reject mechanism includes a divert conveyor with a chain in continuous motion synchronized with the movement of the books on the raceway. When it is desired to move a book from the raceway onto the powered conveyor a selected pair of pins mounted on the divert conveyor chain are extended to engage an edge of the book and move it up the inclined surface and onto the divert conveyor.

10 Claims, 9 Drawing Figures

BOOK REJECT MECHANISM

BACKGROUND OF THE INVENTION

The present invention relates to a mechanism for conveying a stream of books along a raceway and for removing defective books from the raceway.

Certain types of books, particularly paperback books, are assembled in a collator by feeding signatures from a series of hoppers each of which contains a supply of the same page or signature. A conveyor moves past the hoppers each of which delivers a signature in sequence until the book is assembled. The conveyor moves the assemblages along a raceway which supports the growing stack of signatures. The raceway is inclined in a direction transverse to the path of movement of the conveyor. A guide extends vertically upward along the lower edge of the raceway to prevent the assemblages from sliding down the inclined surface. Once the signatures have been assembled, they are carried on the conveyor to a binder where the back is glued in place and the pages or signatures are trimmed.

Occasionally one of the hoppers may misfeed, either feeding an extra signature or failing to feed any. In this case it is necessary to remove the not-yet bound book from the raceway so that it may be repaired or discarded. In the past there have been two approaches to rejecting a defective assemblage of signatures, one applicable to relatively thin assemblages usually of separate individual pages, and one applicable to relatively thick assemblages of signatures comprising a plurality of pages.

When the hoppers are feeding individual sheets and a misfeed is detected, feeding from hoppers downstream of the misfeeding hopper is inhibited. The defective assemblage is lifted onto a set of belts above the raceway by a set of fingers which pivot upward from the raceway. The defective assemblage is either discarded or the pages are manually sorted and returned to the hoppers from which they were fed.

This technique is satisfactory for relatively thin books or magazines, i.e., up to about two inches thick. However, it will not work for thick books or magazines up to three and a half or four inches thick, such as telephone books, because the thick assemblage will not move up the inclined fingers onto the upper conveyor without becoming disheveled. For thick books a second technique, called the repair technique, has been used for handling misfeeds from hoppers.

In the past when assembling a thick book, the hoppers each dispense a signature. In the event that a hopper misfeeds, the raceway conveyor is halted until an operator can manually repair the defective assemblage and restart the conveyor. Obviously, the repair technique can slow production.

SUMMARY OF THE INVENTION

The present invention provides a book reject mechanism which can reject defective thick books eliminating the necessity for stopping the raceway conveyor. The book reject mechanism of the present invention includes a raceway and a raceway conveyor for carrying assemblages of signatures from a collator mechanism toward a binder, a powered conveyor for transporting rejected assemblages, and a divert conveyor for moving rejected assemblages from the raceway onto the powered conveyor.

The raceway conveyor carries the assemblages of signatures along a level path on an inclined surface of the raceway, and the lower edges of the signatures rest against an edge guide. The powered conveyor extends transverse to the path of the raceway conveyor. A first part of the powered conveyor runs flush with the inclined surface of the raceway and a second part of the powered conveyor is horizontal and even with the top of the inclined surface of the raceway. The divert conveyor moves assemblages to be rejected up the inclined surface and onto the horizontal part of the powered conveyor whence they are carried away for further processing.

The divert conveyor includes an endless chain mounted above the powered conveyor, the raceway, and raceway conveyor. The endless chain is supported by sprockets at opposite ends and guide members support the endless chain for movement along a path parallel to the powered conveyor.

A plurality of pins are pivotably mounted on the endless chain of the divert conveyor. Each of the pins is movable between a retracted position in which it does not contact any of the assemblages as the divert conveyor chain circulates and an extended position in which the pin extends downward from the chain into a slot in the raceway. The movement of the divert conveyor chain and the raceway conveyor are synchronized so that when the divert conveyor pins are extended they engage an assemblage as it is crossing the slot in the raceway and move the assemblage up the incline onto the powered conveyor to be carried away for repair or disposal.

A selectively operable cam located at one end of the divert conveyor path moves individual divert pins from their retracted positions to their extended positions. A reset cam at the opposite end of the divert conveyor path returns all extended pins to their retracted positions.

BRIEF DESCRIPTION OF THE DRAWINGS

These and other features of the present invention will be evident from a reading of the following specification together with the accompanying drawings which form a part thereof and in which.

DESCRIPTION OF PREFERRED EMBODIMENT

Figure 1:
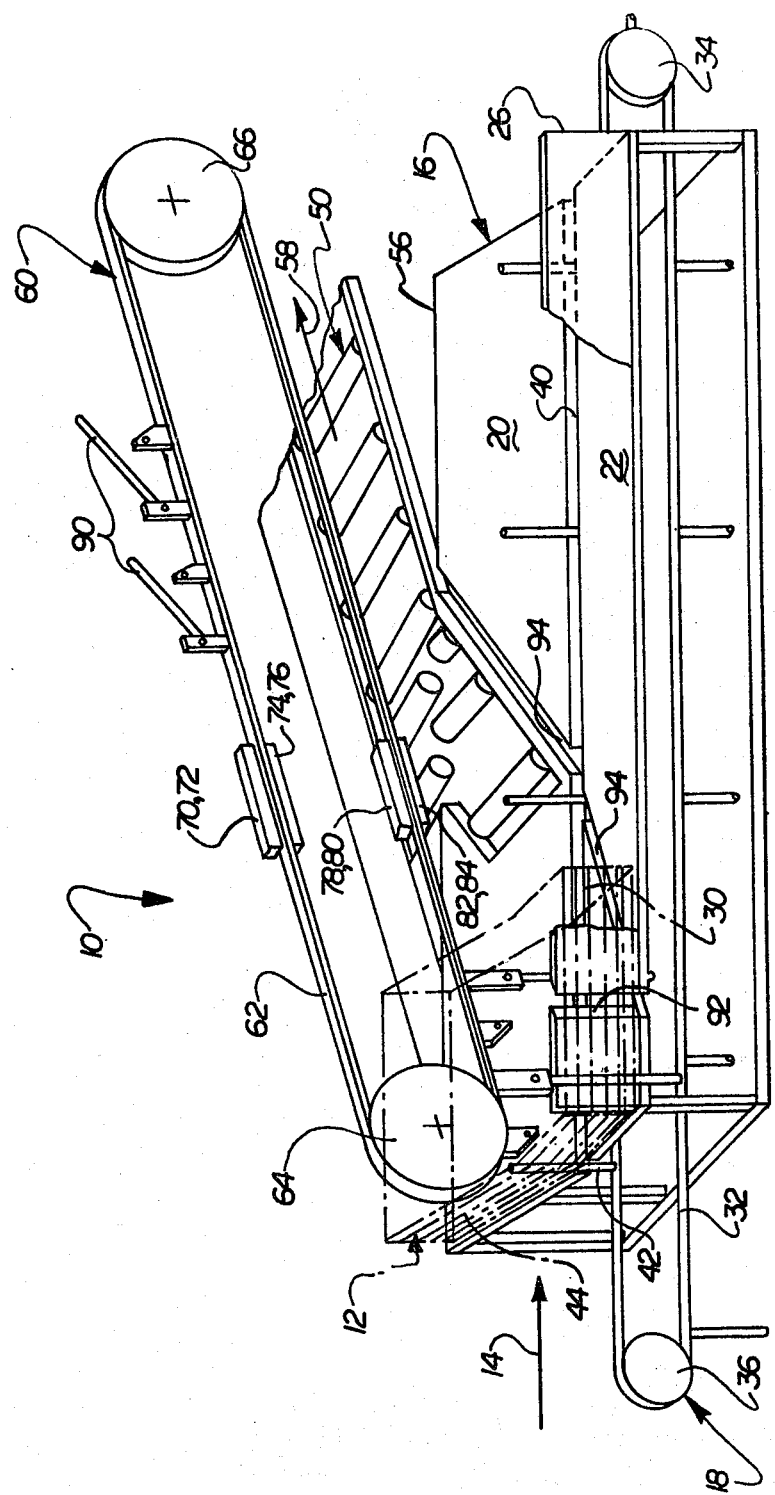
FIG. 1 is a schematic illustration of a book reject mechanism constructed according to the present invention.

A book reject apparatus 10 constructed in accordance with the present invention is illustrated in FIG. 1. Assemblages of signatures (one shown and designated 12) arrive from a collator (not shown) travelling in the direction of arrow 14. The apparatus 10 operates equally well whether the assemblage 12 is formed of individual pages or if signatures which may include many pages.

The assemblages 12 are pushed on a raceway 16 by raceway conveyor 18. The raceway 16 includes an inclined surface 20 and a horizontal surface 22 against which the bottom side surface of the assemblage 12 rests. A vertical edge guide 26 is connected with the side of the horizontal surface 22 which is opposite from the lower edge of the incline surface 20. The end face 30 of the assemblage 12 rests against the edge guide 26 because of the effect of gravity racing on the assemblage on the inclined surface 20.

The raceway conveyor 18 includes an endless chain 32 trained around sprockets 34 and 36 which rotate in a vertical plane and are aligned with a slot 40 between the inclined surface 20 and horizontal surface 22 of the raceway 16. The chain 32 carries a plurality of fixed pins similar to pin 42 which extend perpendicular to the raceway chain and engage the trailing or rear surface 44 of the assemblage 12. The pins 42 extend upward through the slot 40 a distance at least as large as the thickness of the thickest assemblage 12 to be moved on the book reject mechanism 10, approximately four inches. When the chain 32 is driven, the pins 42 push assemblages 12 along the raceway in the direction of arrow 14.

Figure 2:
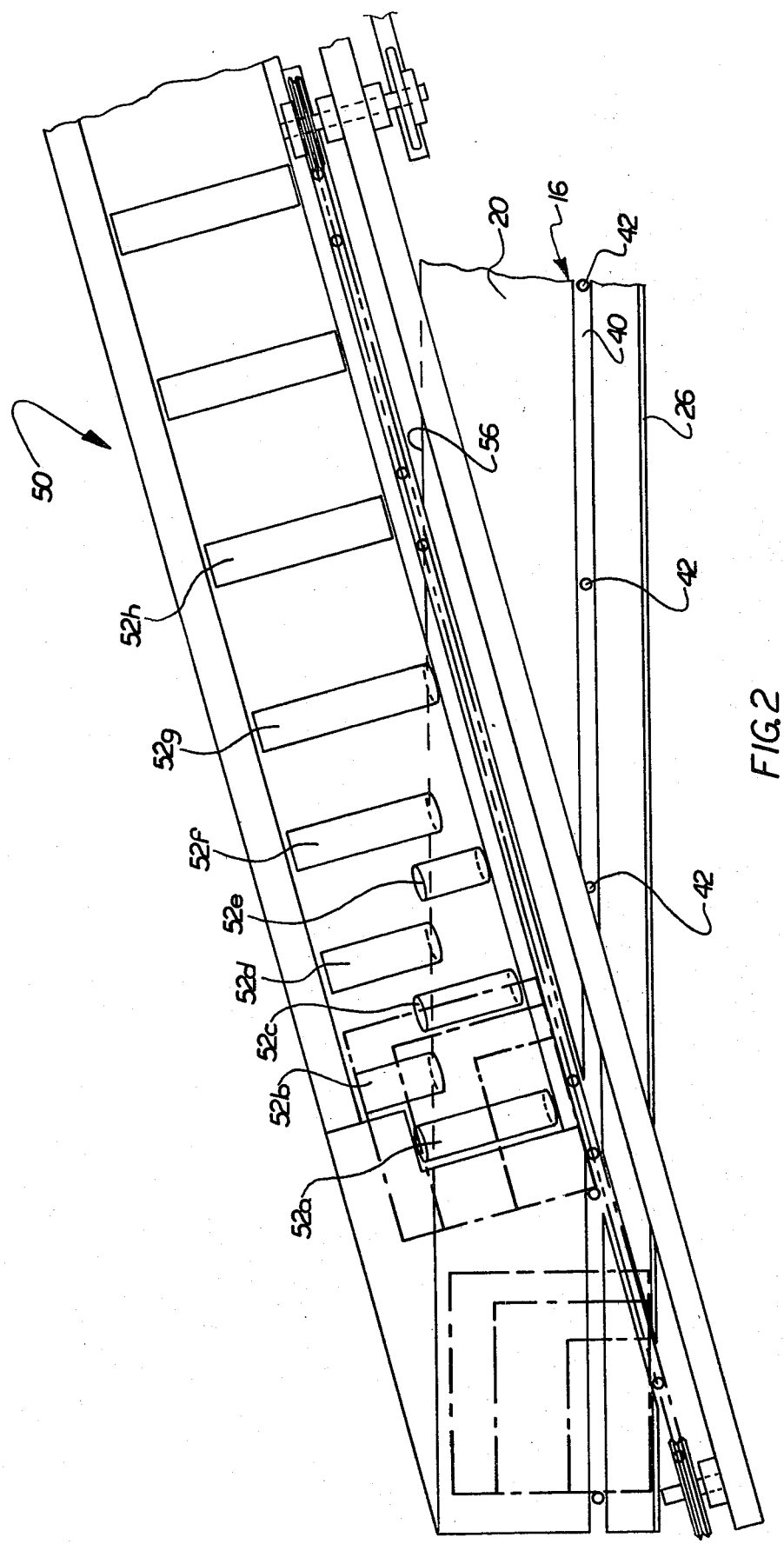
FIG. 2 is a schematic plan view of a portion of the mechanism illustrated in FIG. 1.

A powered conveyor 50 (FIG. 2) extends at an angle of about 15° to the axis of the raceway conveyor 18. The powered conveyor includes a plurality of rollers 52a, 52b, 52c, 52d, 52e, 52f, 52g, and 52h over which a plurality of belts (not shown) are trained in the usual manner. The first part of the powered conveyor 50, including rollers 52a, 52c, and 52e, is arranged so that the top surfaces of the belts (not shown) are flush with the inclined surface 20 of the raceway conveyor 16. The remainder of the powered conveyor 50, including rollers 52b, 52d, 52f, 52g and 52h, is horizontal and even with the upper edge 56 of the inclined surface 20.

In response to a signal from the collator indicating that a particular hopper has misfed, the conveyor 18 is not stopped. Rather, the defective assemblage 12 continues past the remaining hoppers which feed as usual. When the assemblage which has not been properly collated reaches a divert conveyor 60 (FIG. 1), the divert conveyor moves the defective assemblage onto the powered conveyor 50. The powered conveyor 50 removes the defective assemblage in the direction of arrow 58 away from the raceway 16 for further processing which may be either the addition of the missing signatures, the deletion of excess signatures, or the defective assemblage may be discarded.

Figure 4:
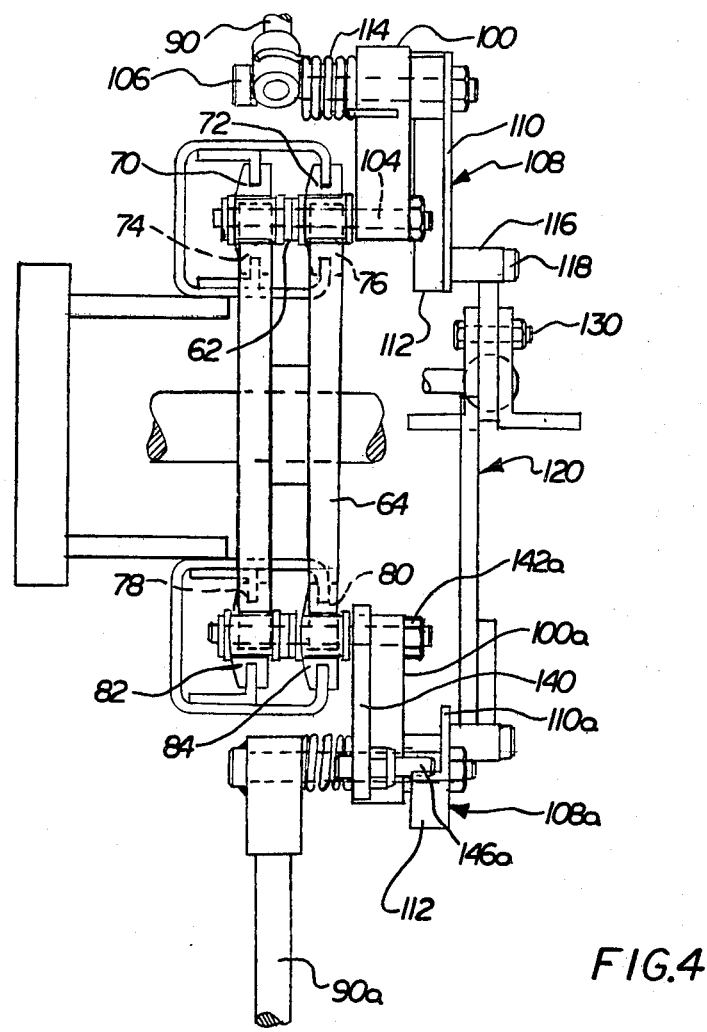
FIG. 4 is a view looking in the direction of arrows 4—4 in FIG. 3.
Figure 5:
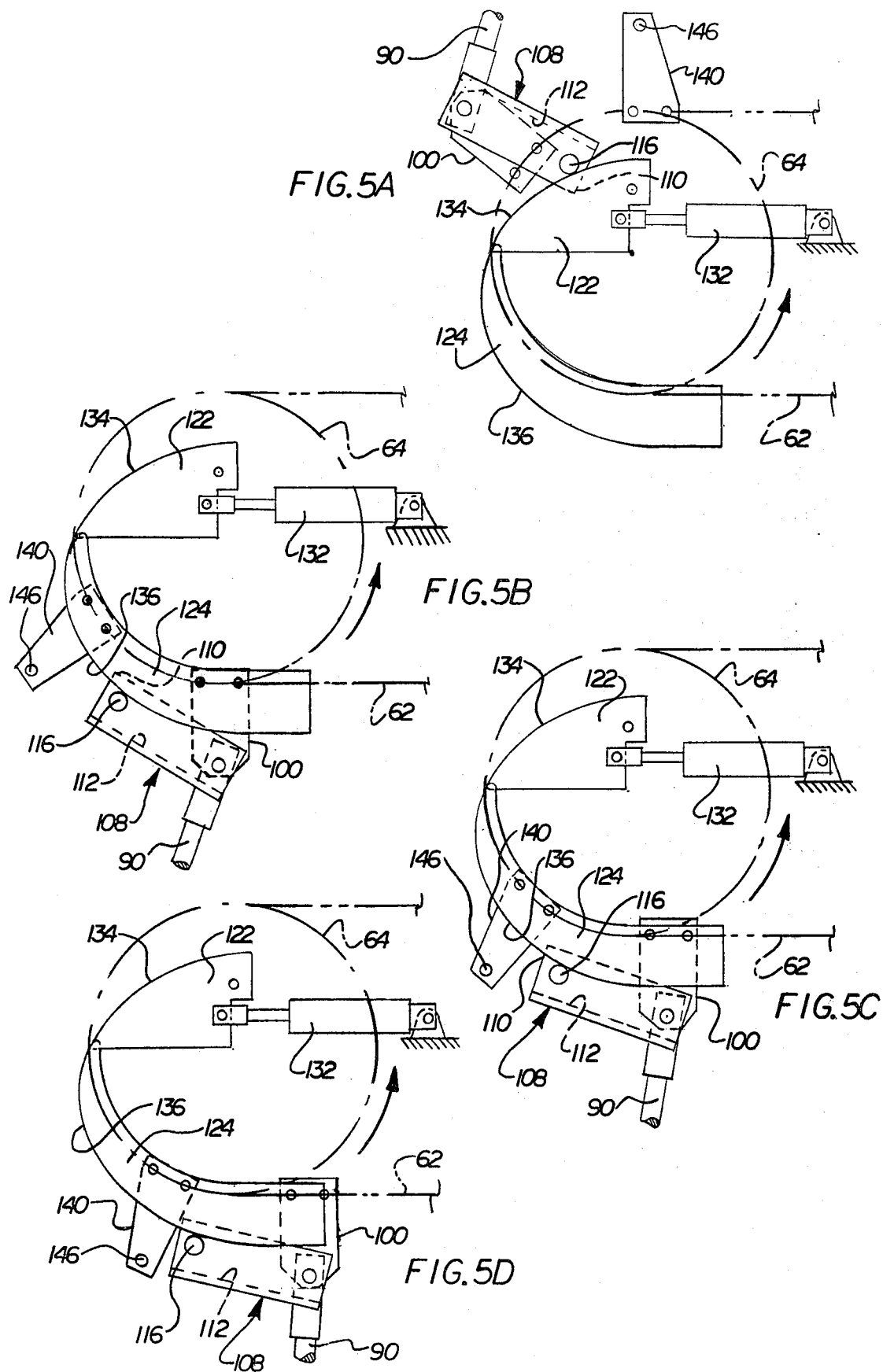
FIGS. 5A–5D illustrate the mechanism of FIG. 3 in a sequence of positions.

The divert conveyor 60 is mounted above the raceway 16 and the powered conveyor 50. The divert conveyor 60 includes a double endless chain 62 (see FIG. 4) trained around sprocket 64 (FIG. 1) at its upstream end and sprocket 66 at its downstream end. The double chain 62 is supported along the straight portions of its path by guides 70, 72, 74, 76, 78, 80, 82, and 84 (FIGS. 1 and 4). The guides 72–84 support the top and bottom sides of the chain between the sprockets 64 and 66 to prevent the chain 62 from twisting or sagging. The guides 70–84 and sprockets 64 and 66 (FIG. 1) cause the chain 62 to travel on a path in vertical plane transverse to the path of movement of the raceway conveyor 18 and parallel to the path of the powered conveyor 50.

The double chain 62 of the divert conveyor 60 carries a plurality of divert pins 90 spaced in pairs evenly about the length of the chain 62, one pair of divert pins for each raceway conveyor pin 52. (Only two pairs of divert pins 90 are shown in FIG. 1 for clarity.) Each divert pin 90 is pivotal between a retracted position (shown in FIG. 1 in the upper run of the chain 62) and an extended position (illustrated in a lower run of the chain 62 in FIG. 1). When the divert pins 90 are in their retracted positions, they circulate with the double chain 62 and make no contact with the assemblages 12 moving on the raceway 16.

When a defective assemblage is detected by the collator and a signal sent to the book reject mechanism 10, an appropriate pair of the pins 90 are pivoted to their extended position. The pins 90 then extend downward, and as the double chain 62 moves the extended pins 90 pass through a slot 92 in the edge guide 26 and engage the side 30 of the assemblage 12 which had been resting against the edge guide 26. A slot 94 is formed in the raceway 16 to permit the pins 90 to move the defective assemblage 12 up the inclined surface 20.

The speeds of the divert conveyor 60, the raceway conveyor 18, and the powered conveyor 50 are coordinated by being driven through gear boxes (not shown) so that when an assemblage is to be rejected, the divert pins 90 engage the downhill side surface 30 of the assemblage while a pin 42 of the raceway conveyor 18 engages the trailing surface 44 of the assemblage. In particular, the divert conveyor 60 and the raceway conveyor 18 are driven so that the component of the velocity of the divert pins 90 taken in the direction of the raceway conveyor 18 is the same as the velocity of the pins 42 on the raceway conveyor. The powered conveyor 50 travels at the same speed as the divert conveyor 60. In this way the extended divert pins 90 engage the side surface 30 of the assemblage 12, and together with the pin 42 of the raceway conveyor 18 move the assemblage at an angle to the raceway 16 and onto the powered conveyor 50 as the pin 42 continues to push the back edge of the assemblage.

Figure 3:
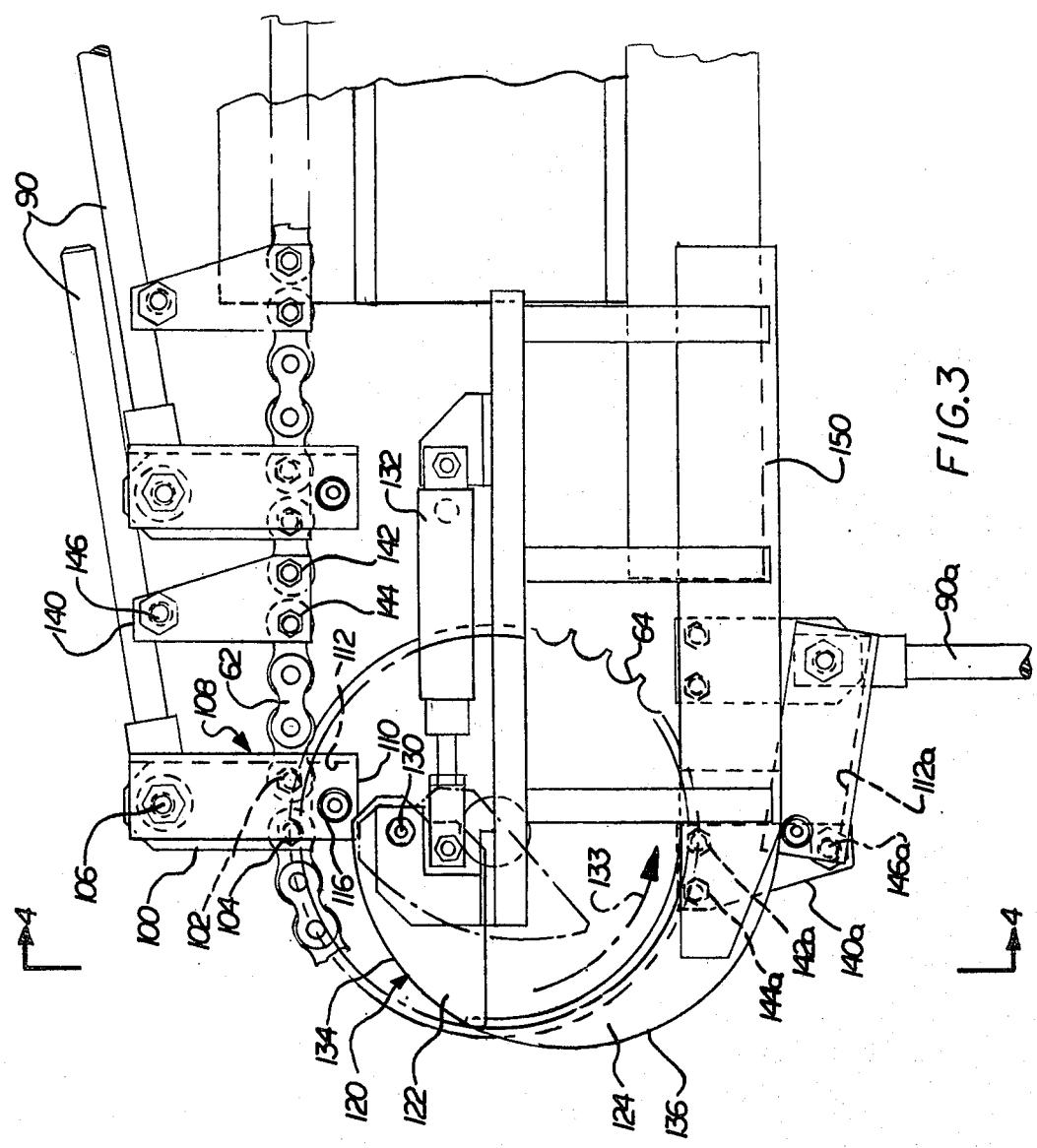
FIG. 3 is a schematic side view of a portion of the mechanism illustrated in FIG. 1.

As previously mentioned, the divert pins 90 are pivotably mounted to double chains 62. All of the divert pins 90 are identical, and accordingly a description of one divert pin is equally applicable to all. Referring to FIGS. 3 and 4, it can be seen that the divert pin 90 is connected with the double chain 62 by means of a divert pin support bracket 100 which is secured to the chain 62 by means of bolts 102 and 104. The divert pin support bracket 100 extends radially outward from the path of the double chain 62. A shaft 106 extends through a passage formed in the outer end of the bracket 100 and is rotatably supported therein perpendicular to the plane of the path of the chain 62. The divert pin 90 is fixedly connected to the shaft 106.

At the opposite end of the shaft 106 is a control arm 108 which is fixedly connected with the shaft 106 and which determines the angular position of the pin 90 with respect to its bracket 100 and the chain 62. The control arm 108 has a side plate 110 and a flange 112 perpendicular thereto. A spring 114 wound around the shaft 106 acts between the pin 90 and the divert pin support bracket 100. The spring 114 serves to bias the divert pin 90 to the retracted position. Contact between the flange 112 of the control arm 108 and the head of bolt 102 (FIG. 3) limits movement of the control arm 108 in a clockwise direction as viewed in FIG. 3 and thus determines the retracted position of the pin 90. The control arm 108 serves to rotate the pin 90 from its retracted position to its extended position against the bias of spring 114. To this end the control arm 108 carries a cam follower 116 which is rotatably supported by bolt 118 which is perpendicular to the side plate 110 and fixedly connected thereto.

A cam mechanism 120 (FIG. 4) is actuatable to move the follower 116 and control arm 108 to thereby rotate shaft 106 and so to move the pin 90 from its retracted position to its extended position. The cam mechanism 120 is located adjacent the sprocket 64 at the upstream end of the divert conveyor 60. The cam mechanism 120 includes a movable cam part 122 and a fixed cam part 124. The movable cam part 122 is pivotable about the axis of shaft 130. When it is not desired to extend any of the pins 90, the movable cam part 122 is pivoted to the position shown in phantom in FIG. 3 by retracting cylinder 132. When the movable cam part 12 is in this position, the cam follower 116 follows the path indicated by arrow 133 and makes no contact with either cam part 122 or cam part 124. Therefore, the control arm 108 is not actuated and the divert pin 90 remains in its retracted position under the bias of spring 114.

In the event that the collator (not shown) sends a signal indicating that an assemblage is to be rejected, the movable cam part 122 is moved to the position shown in solid in FIG. 3 by extension of cylinder 132. When the cam part 122 is in this position, the outer perimeters 134 and 136 of cam parts 122 and 124, respectively, form a continuous cam surface having an increasing radius of curvature.

Movement of the cam follower 116 across the surfaces 134 and 136 as the chain 62 travels around the sprocket 64 is shown schematically in FIGS. 5A, 5B, 5C and 5D in which only a single divert pin 90 is shown for clarity. As shown in these Figures, the movement across cam surfaces 134 and 136 of the cam follower 116 causes the control arm 108 to rotate counterclockwise and the divert pin 90 similarly to rotate counterclockwise and to move from its retracted position to its extended position. By the time the follower 116 has moved about approximately 180° of the circumference of sprocket 64 (see FIG. 5D and divert pin 90a at the bottom of FIG. 3), the divert pin 90 is in its extended position perpendicular to the path of the double chain 62.

The double chain 62 (FIG. 3) also carries stop brackets 140, one such stop bracket for each divert pin 90. All the stop brackets 140 are alike, and therefore description of one suffices as a description for all. The stop bracket 140 is located behind the divert pin 90 with which it is associated and is fastened to the double chain 62 by means of bolts 142 and 144. The stop bracket 140 extends radially outward from the path of the double chain 62. Each stop bracket 140 carries a stop pin 146 that extends perpendicular to the stop bracket. Contact between of the flange 112 with the stop pin 146 once the cam mechanism 120 has rotated the pin 90 to its extended position holds the divert pin in its extended position.

The divert pin support bracket 100 and the stop bracket 142 are essentially parallel with each other during the straight portions of the path of movement of the chain 62. As the divert pin support bracket 100 and the stop bracket 142 move around sprocket 64, the arm 108 starts to rotate on the cam surface 134 and 136, and the stop bracket 140 and the divert pin support bracket 100 move angularly away from each other because of the curvature of the sprocket 64. However, as first the divert pin support bracket 100 and then the stop bracket 140 move off of the sprocket 62 and onto the straight lower portion of the path of chain 62, the support pin 146 moves under the flange 112 (see FIGS. 5B, 5C, 5D and the lowermost stop pin 146a in FIGS. 3 and 4) as the brackets 100 and 140 move back to a more nearly parallel relationship.

The control arm 108 is biased by spring 114 into engagement with the stop pin 142 and simultaneously the cam follower 116 is biased by the spring 114 against the surface of a bracket 150 which forms a continuation of the surface 136 of the fixed cam part 124 for a short distance along the forward run of the double chain 62. Once the bracket 150 terminates, the stop pin 146 alone controls the angular position of the control arm 108. When the extended divert pin 90 contacts an assemblage 12, a load is exerted on the divert pin tending to rotate the divert pin clockwise as viewed in FIG. 3. This load is carried by the support pin 146 and not carried by the cam follower 116. This reduces wear on the cam follower 116.

Figure 6:
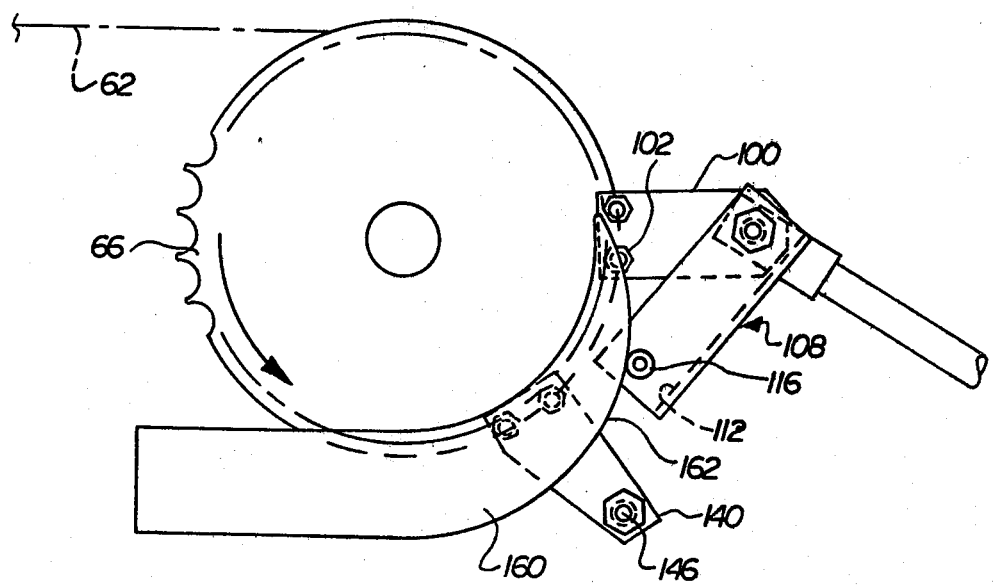
FIG. 6 illustrates a portion of the mechanism of FIG. 1.

At the downstream end adjacent the sprocket 66 (FIG. 1) is a return cam 160 (FIG. 6). The return cam 160 gradually returns any divert pins 90 which may have been in their extended positions to their retracted positions as the chain 62 carries the divert pins around sprocket 66. The return cam 160 has a curved outside surface 162 which has a decreasing radius of curvature. In a manner opposite to that occurring at the upstream end, as the divert pin support bracket 100 moves onto the sprocket 66, the control arm 108 moves angularly away from the stop pin 146 on the stop bracket 140 because of the curvature of the sprocket 66. The cam follower 116 follows the surface 162 of the return cam 160 moving radially inward as the divert pin support bracket 100 moves around the sprocket 62 until the flange 112 is once more abutting the bolt head 102 which mounts the divert pin support bracket 100 to the double chain 62. In this way, all divert pins are returned to their retracted positions for the return, upper portion of the path of movement of the double chain 62.

Thus it is clear that the book reject mechanism 10 is effective to remove assemblages 12 up to four inches thick from a raceway conveyor 16 so that defective assemblages may be repaired without stopping the raceway conveyor. The book reject mechanism 10 of the present invention includes a raceway 16 and a raceway conveyor 18 for carrying assemblages 12 from a collator mechanism toward a binder, a powered conveyor 50 for transporting rejected assemblages and a divert conveyor 60 for moving rejected assemblages from the raceway 16 onto the powered conveyor.

The raceway conveyor 18 carries assemblages 12 along a level path on an inclined surface 20 of the raceway, and the lower edges 30 of the asssemblages rest against an edge guide 26. The powered conveyor 50 extends transverse to the path of the raceway conveyor 18. Rollers 52a, 52c, 52d define a first part of the powered conveyor 50 which runs flush with the inclined surface 20 of the raceway 16 and rollers 52b, 52d, 52f, 52g, 52h define a second part of the powdered conveyor which is horizontal and even with the top 56 of the inclined surface of the raceway. The divert conveyor 60 moves assemblages 12 to be rejected up the inclined surface 20 and onto the horizontal part of the powered conveyor 50 whence they are carried away.

The divert conveyor 60 includes an endless chain 62 mounted above the powered conveyor 50, the raceway 16, and raceway conveyor 18. The endless chain 62 is supported by sprockets 64 and 66 at opposite ends and guide members 70, 72, 74, 76, 78, 80 and 82 support the endless chain for movement along a path parallel to the powered conveyor 50.

A plurality of pins 90 are pivotably mounted on the endless chain 62 of the divert conveyor 60. Each of the pins 90 is movable from a retracted position in which it does not contact an assemblage during its forward run of the chain 62 and an extended position in which the pins extends downward from the chain into a slot 94 in the raceway 16 to engage and move an assemblage off the raceway. The movement of the divert conveyor chain 62 and the raceway conveyor 18 are synchronized so that when the divert conveyor pins 90 are extended they engage an assemblage 12 as it is crossing the slot 94 in the raceway 16 and move it up the incline 20 onto the powered conveyor 50 to be carried away for repair or disposal.

A selectively operable cam 122 (FIG. 3) located at one end of the divert coveyor path moves individual divert pins 90 from their retracted positions to their extended positions. A reset cam 162 (FIG. 6) at the opposite end of the divert conveyor path returns all extended pins 90 to their retracted positions.

What is claimed is:

1. Apparatus for handling assemblages of sheet-like items comprising a raceway for receiving and supporting assemblages, a raceway conveyor having spaced raceway pins thereon projecting through said raceway for engaging trailing surfaces of assemblages positioned thereon and for pushing the assemblages along the raceway, powered conveyor means for receiving and moving assemblages thereon away from said raceway, said powered conveyor means extending at an angle to the direction of movement of said raceway conveyor, a divert conveyor for moving defective assemblages off said raceway and onto said powered conveyor means, said divert conveyor including a plurality of divert pins, means supporting said divert pins for movement between a retracted position and an extended position in which said divert pins project into the path of movement of said assemblages on said raceway, means for moving at least one of said divert pins to its extended position so that said one divert pin is adapted to engage a side of a defective assemblage, said divert conveyor extending generally parallel to said powered conveyor means, said divert pins moving in a path that intersects the path of movement of said raceway pins, and said one divert pin cooperating with a respective raceway pin to push the defective assemblage from said raceway onto said powered conveyor means.

2. An apparatus as set forth in claim 1 wherein two of said divert pins engage said side of defective assemblages.

3. Apparatus as defined in claim 1 wherein said raceway includes an inclined portion inclined in a direction transverse to the direction of movement of said raceway conveyor, and a guide means for guiding the assemblages along said raceway, said guide means projecting upward from said raceway at the lower side thereof, and having an opening through which said divert pins move when said divert pins are to engage an assemblage.

4. An apparatus as set forth in claim 3 wherein said divert conveyor is located above said raceway and the tips of said divert pins extend below the surface of said raceway when said divert pins are in their extended position.

5. An apparatus as set forth in claim 4 wherein said raceway includes an opening located below said divert conveyor in which said tips of said extended divert pins move, said opening in said raceway being aligned with said opening in said guide means and extending parallel to the path of said powered conveyor means.

6. Apparatus for handling assemblages of sheet-like items comprising a raceway for receiving and supporting assemblages, a raceway conveyor having spaced raceway pins thereon for engaging trailing surfaces of assemblages positioned thereon and for pushing the assemblages along the raceway, conveyor means for receiving and directing assemblages thereon away from said raceway, said conveyor means extending at an angle to the direction of movement of said raceway conveyor, a divert conveyor for moving defective assemblages off said raceway and onto said conveyor means, said divert conveyor including a plurality of divert pins, means supporting said divert pins for movement between a retracted position and an extended position in which said divert pins project into the path of movement of said assemblages on said raceway, means for moving at least one of said divert pins to its extended position so that said one divert pin is adapted to engage a side surface of a defective assemblage, said divert conveyor extending generally parallel to said conveyor means, said divert pins moving in a path that intersects the path of movement of said raceway pins, and said one divert pin cooperating with a respective raceway pin to push the defective assemblage from said raceway onto said conveyor means.

7. Apparatus as defined in claim 6 wherein said raceway includes an inclined portion inclined in a direction transverse to the direction of movement of said raceway conveyor, and guide means for guiding the assemblages along said raceway, said guide means projecting upward from said raceway at the lower side thereof, and having an opening through which said divert pins move when said divert pins are to engage an assemblage.

8. Apparatus for handling assemblages of sheet-like items comprising a raceway for receiving and supporting assemblages, a raceway conveyor having spaced raceway pins thereon projecting through said raceway for engaging an assemblage positioned thereon and for pushing the assemblage along the raceway, powered conveyor means for receiving and moving assemblages thereon away from said raceway, said powered conveyor means extending at an angle to the direction of movement of said raceway conveyor, a divert conveyor for moving defective assemblages off said raceway and onto said powered conveyor means, said divert conveyor including a plurality of divert pins, means supporting said divert pins for movement between a retracted position and an extended position in which said divert pins project into the path of movement of said assemblages on said raceway, means for moving at least one of said divert pins to its extended position so that said one divert pin is adapted to engage a defective assemblage and push that assemblage from said raceway conveyor onto said powered conveyor means, said divert conveyor extending generally parallel to said powered conveyor means and said divert pins moving in a path that intersects the path of movement of said raceway pins, said divert conveyor including an endless chain, said means for supporting said divert pins for movement between extended and retracted positions including pivot means for separately and pivotably connecting each of said pins with said chain and for enabling rotation of such of said pins about an axis transverse to the longitudinal axis of said pin, a lever connected with one end portion of said pin and movable to effect rotation of said pin, spring means for biasing said pins to said retracted position, cam means for moving said pin to said extended position and means for holding said pin in said extended position.

9. Apparatus for handling assemblages of sheet-like items comprising a raceway for receiving and supporting assemblages, a raceway conveyor for moving said assemblages along said raceway, said raceway including an inclined portion and a horizontal portion along which said assemblages are moved by said raceway conveyor, a conveyor means for receiving and moving assemblages thereon away from said raceway, said conveyor means including a first part that extends at an angle to the direction of movement of assemblages along said raceway an runs flush with said inclined portion of said raceway and a second part that is horizontal, and divert means for moving defective assemblages off said raceway and along said first part of said conveyor means.

10. Apparatus as set forth in claim 9 wherein said divert means includes a divert convert which extends generally parallel to said conveyor means for receiving and moving assemblages thereon away from said raceway, said divert conveyor including a plurality if divert pins, means supporting said divert pins for movement between a retracted position and an extended position in which said divert pins project into the path of movement of said assemblages on said raceway, means for moving at least one of said divert pins to its extended position so that said one divert pin is adapted to engage a defective assemblage and push that assemblage from said raceway conveyor onto said conveyor means for receiving and moving assemblages thereon away from said raceway.

* * * * *

UNITED STATES PATENT AND TRADEMARK OFFICE
CERTIFICATE OF CORRECTION

PATENT NO. : 4,429,795
DATED : February 7, 1984
INVENTOR(S) : Richard B. Hawkes

It is certified that error appears in the above-identified patent and that said Letters Patent are hereby corrected as shown below:

Column 8, line 67 change "such" to -- each --.

Column 9, line 16, change "an" to -- and --.

Column 10, line 7 change "if" to -- of --.

Column 10, line 4 change "convert" to -- conveyor --.

Signed and Sealed this

Seventeenth Day of April 1984

[SEAL]

Attest:

GERALD J. MOSSINGHOFF

Attesting Officer   Commissioner of Patents and Trademarks